(12) United States Patent
Krishnaswamy et al.

(10) Patent No.: US 9,140,224 B2
(45) Date of Patent: Sep. 22, 2015

(54) ELECTROMAGNETIC ACTUATOR AND METHOD FOR CONTROLLING FLUID FLOW

(75) Inventors: Harish K Krishnaswamy, Normal, IL (US); Nadeem N Bunni, Cranberry Township, PA (US); Stephen R Lewis, Chillicothe, IL (US); Dana R Coldren, Fairbury, IL (US)

(73) Assignee: Caterpillar Inc., Peoria, IL (US)

( * ) Notice: Subject to any disclaimer, the term of this patent is extended or adjusted under 35 U.S.C. 154(b) by 2148 days.

(21) Appl. No.: 11/155,839

(22) Filed: Jun. 17, 2005

(65) Prior Publication Data
US 2006/0284129 A1 Dec. 21, 2006

(51) Int. Cl.
| | |
|---|---|
| *F16K 31/06* | (2006.01) |
| *F02M 57/02* | (2006.01) |
| *F02M 47/02* | (2006.01) |
| *F02M 59/36* | (2006.01) |
| *F02M 63/00* | (2006.01) |
| *H01F 7/08* | (2006.01) |
| *H01F 7/16* | (2006.01) |

(52) U.S. Cl.
CPC ............ *F02M 57/02* (2013.01); *F02M 47/027* (2013.01); *F02M 59/366* (2013.01); *F02M 63/0015* (2013.01); *F02M 63/0049* (2013.01); *F16K 31/0675* (2013.01); *H01F 7/081* (2013.01); *H01F 7/1638* (2013.01)

(58) Field of Classification Search
CPC .. F16K 31/0675; F02M 47/027; F02M 57/02; F02M 59/366; F02M 63/0015; F02M 63/0049; H01F 7/081; H01F 7/1638
USPC ............ 251/129.1, 129.01, 129.15, 129.16, 251/129.21, 129.22; 335/281, 297
See application file for complete search history.

(56) References Cited

U.S. PATENT DOCUMENTS

| | | | | |
|---|---|---|---|---|
| 3,797,756 | A | * | 3/1974 | Voit et al. .................... 239/585.5 |
| 4,924,126 | A | * | 5/1990 | Isozumi .......................... 310/83 |
| 5,407,131 | A | | 4/1995 | Maley et al. |
| 5,488,340 | A | | 1/1996 | Maley et al. |
| 5,494,219 | A | | 2/1996 | Maley et al. |
| 5,717,372 | A | | 2/1998 | Cannon et al. |
| 5,939,963 | A | | 8/1999 | Harcombe |
| 5,975,437 | A | | 11/1999 | Streicher et al. |
| 5,984,210 | A | | 11/1999 | Forck et al. |
| 6,113,014 | A | | 9/2000 | Coldren et al. |
| 6,267,306 | B1 | * | 7/2001 | Phillips et al. ............. 239/585.1 |

(Continued)

FOREIGN PATENT DOCUMENTS

| | | |
|---|---|---|
| DE | 19923550 | 1/2000 |
| DE | 69714388 | 9/2002 |

(Continued)

*Primary Examiner* — William McCalister
(74) *Attorney, Agent, or Firm* — Miller, Matthias & Hull LLP

(57) ABSTRACT

An apparatus and method for controlling fluid flow is disclosed. An electromagnetic actuator may include a stator having an inner pole member and an outer pole member. The outer pole member may have a fluid passageway therein for transmitting fluid through the outer pole member. The actuator may further include a coil disposed around the inner pole member and arranged between the inner pole member and the outer pole member. The actuator may also include an armature moveable under the influence of a magnetic field generated by the stator and coil and operable to affect transmission of the fluid through the fluid passageway.

27 Claims, 6 Drawing Sheets

(56) References Cited

U.S. PATENT DOCUMENTS

| | | | |
|---|---|---|---|
| 6,279,843 B1 * | 8/2001 | Coldren et al. | 239/585.1 |
| 6,405,940 B2 | 6/2002 | Harcombe et al. | |
| 6,496,092 B1 | 12/2002 | Schnatterer et al. | |
| 6,520,432 B2 | 2/2003 | Molnar | |
| 6,655,611 B2 | 12/2003 | Muller-Girard, Jr. et al. | |
| 6,732,959 B2 | 5/2004 | Delaney et al. | |
| 6,776,190 B2 * | 8/2004 | Schoepke et al. | 137/625.65 |
| 6,799,559 B2 | 10/2004 | Mieny et al. | |
| 6,976,474 B1 * | 12/2005 | Coldren et al. | 123/446 |
| 7,059,301 B2 * | 6/2006 | Stockner et al. | 123/446 |
| 7,080,819 B2 * | 7/2006 | Tojo | 251/129.16 |
| 2001/0035464 A1 | 11/2001 | Harcombe et al. | |
| 2003/0099562 A1 * | 5/2003 | Coldren et al. | 417/470 |
| 2004/0084649 A1 | 5/2004 | Yoshimura et al. | |
| 2004/0124272 A1 * | 7/2004 | Yacoub et al. | 239/533.2 |
| 2004/0194763 A1 | 10/2004 | Fukuhara | |
| 2004/0217206 A1 | 11/2004 | Dong et al. | |

FOREIGN PATENT DOCUMENTS

| | | |
|---|---|---|
| EP | 0845791 | 6/1998 |
| EP | 0987431 | 3/2000 |
| EP | 0987432 | 3/2000 |
| EP | 1120563 | 8/2001 |
| GB | 2338834 | 12/1999 |
| JP | 2002188745 | 7/2002 |
| JP | 2004156709 | 6/2004 |

* cited by examiner

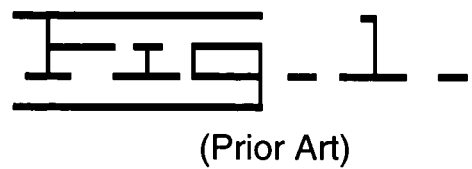
(Prior Art)
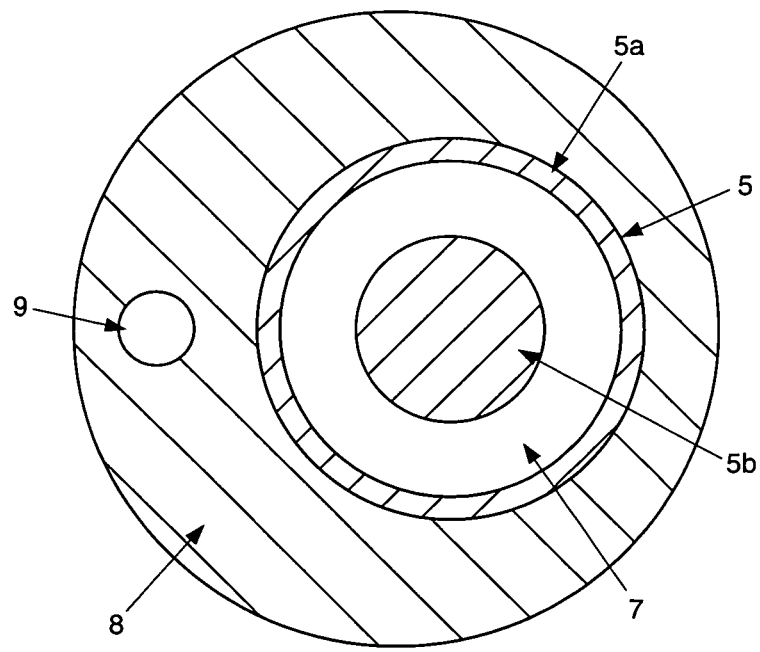

ELECTROMAGNETIC ACTUATOR AND METHOD FOR CONTROLLING FLUID FLOW

TECHNICAL FIELD

This invention relates generally to a method and apparatus for controlling fluid flow and, more particularly, to a method and apparatus for controlling fluid flow through an electromagnetic actuator.

BACKGROUND

Electromagnetic actuators are often used to control the injection of fuel into an internal combustion engine. In one example, fuel is delivered to the pumping chamber of a fuel injector, and a plunger piston (which may be moved in response to rotation of a cam arrangement) forces fuel from the pumping chamber. When an electrical solenoid within the fuel injector is activated, a control valve connecting the pumping chamber to a low-pressure tank is closed and fuel from the pumping chamber is forced toward the tip of the fuel injector, through a fuel nozzle, and subsequently into the combustion chamber of an engine. However, when the electrical solenoid is deactivated, the control valve remains open and fuel from the pumping chamber is forced into the low-pressure tank instead of being transmitted to the fuel nozzle and into the combustion chamber.

As shown in FIG. 1, an electromagnetic actuator as described above may include a stator 5 having an outer pole 5a and an inner pole 5b and may have a coil 7 disposed around the inner pole 5b between the inner pole 5b and the outer pole 5a. The stator 5 and coil 7 may be arranged within the bore of a stator housing 8. A high pressure fluid bore 9 may be formed through the housing 8 for transmission of fluid from the pumping chamber (not shown) toward the nozzle (not shown) of the fuel injector for subsequent injection into the combustion chamber of the engine.

Various improvements to electromagnetic actuators for controlling fluid flow have been made in the past. For example, various geometric configurations for inner and outer poles of a stator have been proposed with the intention of increasing pole area to thereby increase actuation force. However, as inner and outer pole dimensions are increased or modified, complex geometries for the stator and stator housing may be required—for example to (i) maintain desired product envelope dimensions, and/or (ii) insure that the high pressure fluid passageway 9 within the housing 8 is supported by sufficient high strength housing material for transmitting high pressure fluid through the housing 8 without rupture. Moreover, while various geometric configurations for inner and outer poles, coils, and stator housings have been proposed in the past, increased costs associated with producing such geometries may overcome other accomplished objectives.

Prior methods and devices for controlling fluid flow may be improved further by providing advanced actuator configurations that more effectively balance stator-coil force capacity, fluid passageway strength, and production cost and capability.

The present invention is directed at overcoming one or more disadvantages associated with prior devices and methods for controlling fluid flow through an electromagnetic actuator.

SUMMARY OF THE INVENTION

In one aspect of the present invention, an electromagnetic actuator for controlling fluid flow is provided. The actuator may include a stator having an inner pole member and an outer pole member. The outer pole member may have a fluid passageway therein for transmitting fluid through the outer pole member. The actuator may further include a coil disposed around the inner pole member and arranged between the inner pole member and the outer pole member. The actuator may also include an armature moveable under the influence of a magnetic field generated by the stator and coil and operable to affect transmission of the fluid through the fluid passageway.

In another aspect of the present invention, a method for controlling fluid flow through an actuator is provided. The method may include energizing or deenergizing a coil disposed between an inner pole member and an outer pole member to create or modify a magnetic field; moving an armature in response to the creation or modification of the magnetic field; and causing fluid to be transmitted through a fluid passageway within the outer pole member in response to moving the armature.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments or features of the invention and, together with the description, serve to explain the principles of the invention. In the drawings, FIG. 1 is a diagrammatic cross-sectional view of part of a prior art electromagnetic actuator assembly;

Although the drawings depict exemplary embodiments or features of the present invention, the drawings are not necessarily to scale, and certain features may be exaggerated in order to better illustrate and explain the present invention. The exemplifications set out herein illustrate exemplary embodiments or features of the invention and such exemplifications are not to be construed as limiting the scope of the invention in any manner.

DETAILED DESCRIPTION

Reference will now be made in detail to embodiments or features of the invention, examples of which are illustrated in the accompanying drawings. Wherever possible, the same or corresponding reference numbers will be used throughout the drawings to refer to the same or corresponding parts.

Figure 2:
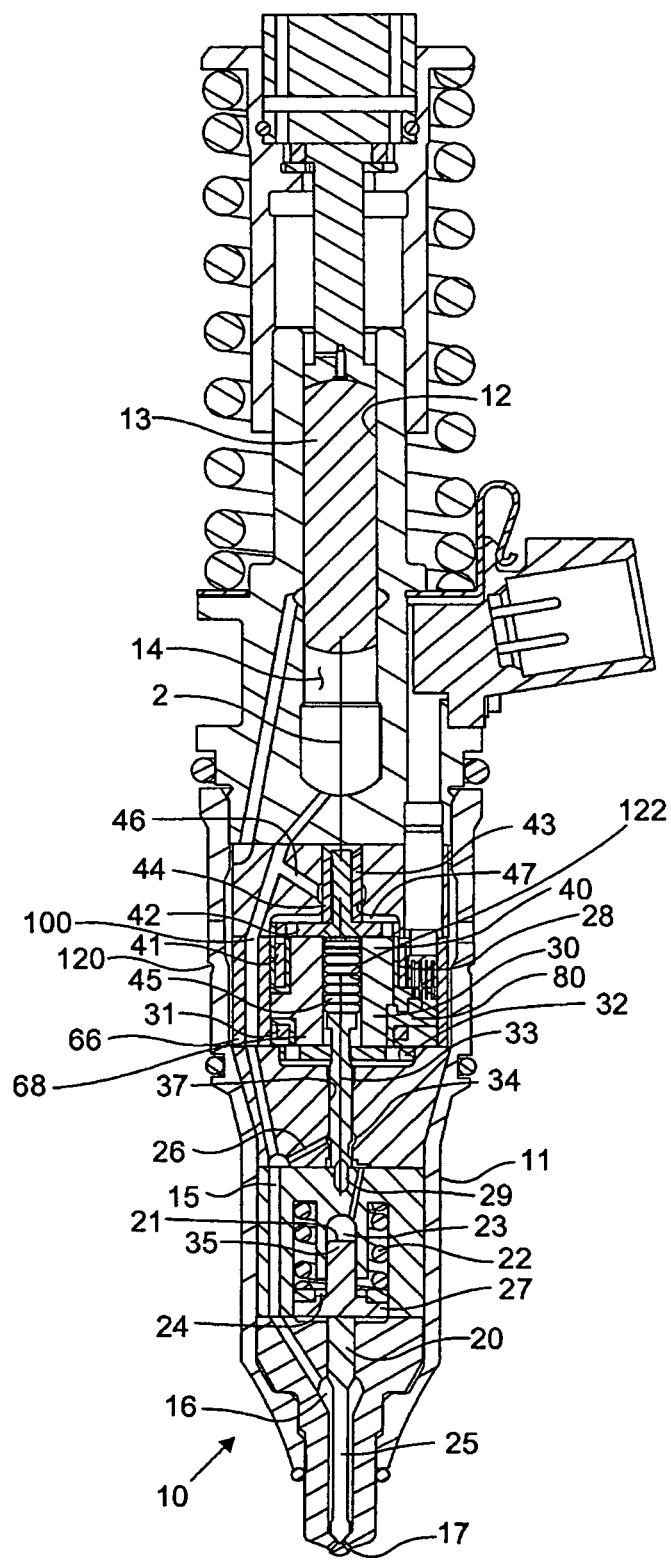
FIG. 2 is a partial front sectioned diagrammatic view of a fuel injector according to one embodiment of the present invention.

Referring now to FIG. 2, an electromagnetic actuator, such as a fuel injector 10, for controlling fluid flow may include an injector body 11 made up of a plurality of components attached to one another. The injector body 11 may define a plunger bore 12 within which a plunger 13 is driven to reciprocate by some suitable means, such as hydraulic pressure or a cam driven tappet assembly. A portion of the plunger bore 12 and the plunger 13 may define a fuel pressurization chamber 14 that communicates with a nozzle outlet 17 via a high pressure passage 15 and a nozzle chamber 16. A needle valve member 20 may be normally biased by a spring 22 to a position that blocks the nozzle outlet 17. During an injection event, the needle valve member 20 lifts to an open position to open the nozzle outlet 17.

When the plunger 13 is undergoing its downward pumping stroke, pressure may be unable to build in the fuel pressurization chamber 14 while a spill valve assembly 40 is in its open position. The spill valve assembly 40 may include a solenoid 41 that has an armature 42 attached to a spill valve member 43. A biasing spring 45 may normally bias the spill valve member 43 away from a high pressure seat 44 to open fluid communication between a high pressure spill passage 46 and a low pressure spill passage 47. In other words, when the spill valve solenoid 41 is de-energized, the fuel pressurization chamber 14 is open to a low pressure area 28 within the injector body 11 via a portion of the high pressure passage 15, the high pressure spill passage 46, and the low pressure spill passage 47. Thus, when the spill valve 40 is open, the fuel displaced from the fuel pressurization chamber 14 is recirculated for later use, and pressure within the fuel injector is unable to build to the relatively high injection pressures. When the spill valve solenoid 41 is energized, the armature 42 and the spill valve member 43 are pulled toward the solenoid 40 to close the high pressure seat 44, which causes fuel pressure in the fuel pressurization chamber 14, the high pressure passage 15, and the nozzle chamber 16 to rise rapidly. Thus, in order to raise fuel pressure to initiate an injection event, the spill valve solenoid 41 may be energized to close the spill valve assembly 40.

In order to control the precise timing at which an injection event will begin, the needle valve member 20 may include an annular closing hydraulic surface 21 exposed to fluid pressure in a needle control chamber 23, which may be alternately exposed to low or high pressure. The needle valve member 20 may include a needle portion 25, a spacer portion 27, a pin stop portion 35, and a needle control piston 24. Depending upon the position of a needle control valve member 33, the needle control chamber 23 is either connected to a high pressure passage 26 or a low pressure passage 29. The needle control valve member 33 is a portion of a needle control valve assembly 30 that includes a needle control solenoid 31, which has an armature 32 attached to valve member 33. The biasing spring 45 may normally bias the armature 32 and the needle control valve member 33 downward toward a position that opens a high pressure seat 34. When the needle control solenoid 31 is de-energized, the needle control chamber 23 is in fluid communication with the fuel pressurization chamber 14 via a portion of the high pressure passage 15 and high pressure passage 26, past the high pressure seat 34. When the needle control solenoid 31 is energized, the needle control valve member 33 lifts to close the high pressure seat 34. When this occurs, the needle control chamber 23 is fluidly connected to the low pressure area 28 via low pressure passage 29. Thus, when the needle control solenoid 31 is energized, the annular closing hydraulic surface 21 is exposed to low fluid pressure, which causes the needle valve member 20 to behave as an ordinary spring biased check valve. However, the closing hydraulic surface 21 is preferably sized to hold the needle valve member 20 in its closed position, even in the presence of high fuel pressures, when solenoid 31 is de-energized.

With reference to FIGS. 3-8, particular attention will be given hereinbelow to the solenoids 41, 31 of the fuel injector 10. The solenoids 41, 31 may include a stator 60, a coil 64, 65, and an armature 42, 32 (shown only in FIGS. 6a and 6b). The stator 60 may include an outer pole member 66 and an inner pole member 68a, 68b. As shown in the referenced Figures, top and bottom solenoids 41, 31 may be formed from a single outer pole block 67 defining an outer pole member 66 for both solenoids, a single inner pole block 70 (FIGS. 7 and 8) defining top and bottom inner pole members 68a, 68b, and two coils 64, 65 so that space and materials are used efficiently within the fuel injector 10. It should be appreciated, however, that a dual solenoid arrangement is not necessary, and that a single solenoid arrangement may include a single outer pole member 66, a single inner pole member 68a (or 68b), and a single coil 64 (or 65).

Figure 5:
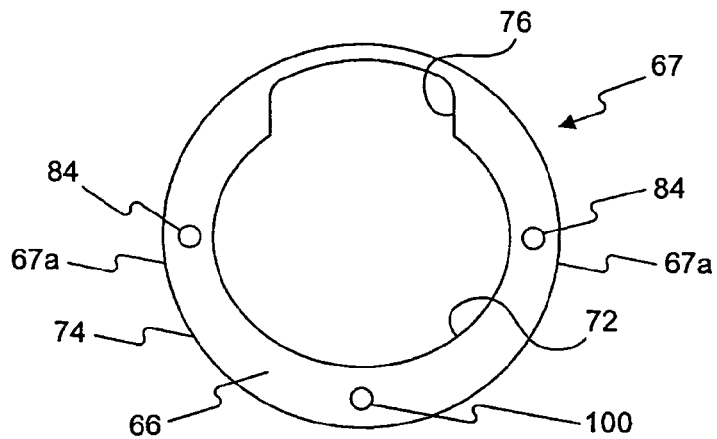
FIG. 5 is a top plan view of the outer pole member of FIG. 2.

The outer pole member 66 may have an opening 72 therein for receipt of the inner pole member 68a, 68b and the coil 64, 65. As best seen in FIG. 5, the opening 72 may have a generally oval-shaped cross-section, while the outer circumference 74 of the outer pole member 66 may be generally circular in shape. The opening 72 may include a connector chamber portion 76 for receipt of an electrical connector 80 (shown only in FIG. 2) therein. As shown in FIG. 5, the connector chamber portion 76 may deviate from or otherwise not conform to the generally oval shape of the cross-section so that the connector 80 may be accommodated inside the opening 72 in the outer pole member 66 adjacent the inner pole member 68a, 68b. The electrical connector 80 may be operably electrically coupled to a coil 64, 65 and may include electrical wires (not shown) extending out of the outer pole member 66 for connection with a control apparatus.

The outer pole member 66 may also have one or more dowel bores 84 (shown only in FIGS. 5, 6a, and 6b) formed longitudinally therein. During assembly, a portion of a dowel member (not shown) may be inserted into a respective dowel bore 84 in the outer pole member 66, and an opposite portion of the dowel member may be inserted into a dowel bore of an adjoining fuel injector component to insure that the outer pole member 66 is properly aligned with the adjoining fuel injector component inside the fuel injector 10.

The outer pole member 66 may be formed, for example, from a material that (i) is sufficiently strong to provide an adequate housing for the inner pole 68a, 68b, coil 64, 65, and electrical connector 80 components, (ii) is sufficiently strong to provide therein a bore 100 for the transmission of high pressure fluid therethrough, and (ii) provides appropriate magnetic properties sufficient for service as a pole member. For example, the outer pole member 66 may be formed from SAE4118 steel. When proper material is chosen for the outer pole member 66, and proper geometrical arrangement is established between the stator components and the coil, the outer pole member 66 may serve as a stator housing and may also provide a fluid passageway 100 therein for the transmission of high pressure fluid therethrough. In the embodiment of FIGS. 3-8, the fluid passageway 100 is formed longitudinally through a wall of the outer pole member having a thickness sufficient to permit high pressure fluid to be transmitted therethrough without rupture of the wall. For example, in one embodiment, the outer pole member 66 may be configured for the transmission of fluid through the fluid passageway 100 at pressures greater than about 200 MPa. As shown in FIG. 5, the fluid passageway 100 may be positioned generally diametrically opposite the connector chamber portion 76 and circumferentially between two dowel bores 84, at a relatively thick-walled portion of the outer pole member 66.

It should be appreciated that the outer pole member 66 may be formed using a variety of processes. For example, the outer pole member 66 may be machined from a single piece of material, or it may be formed via a Metal Injection Molding (MIM) process.

Figure 3:
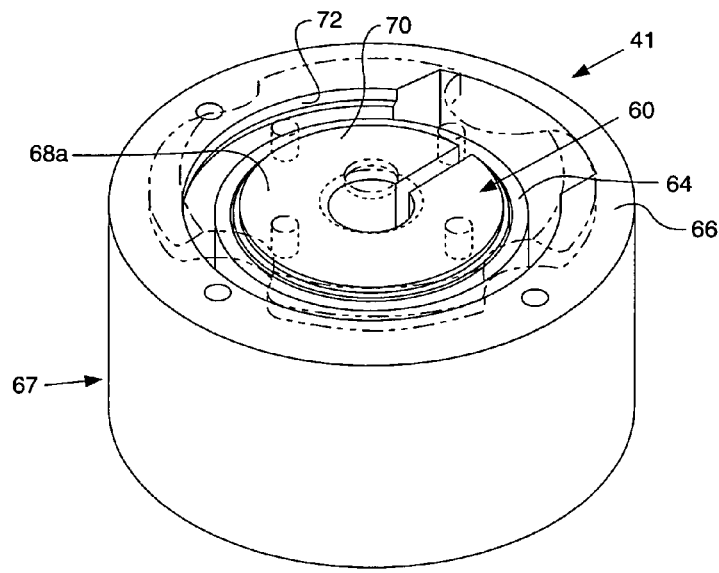
FIG. 3 is a partial top perspective view of the stator and coil assembly of FIG. 2.
Figure 4:
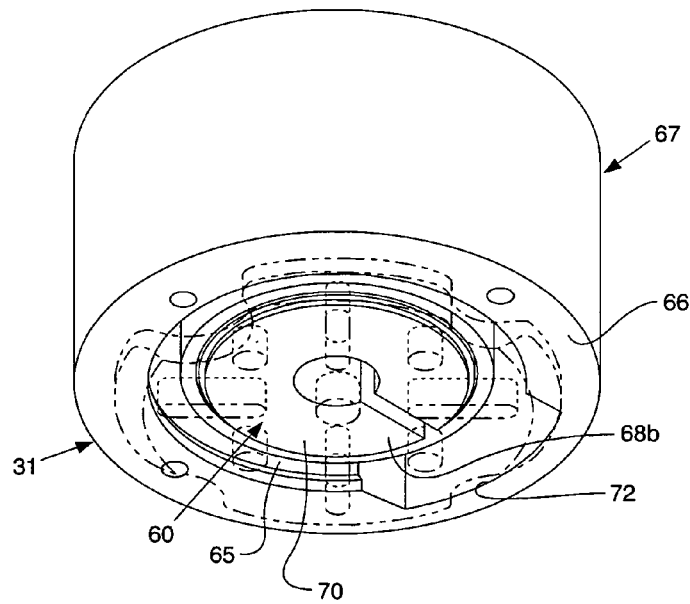
FIG. 4 is a partial bottom perspective view of the stator and coil assembly of FIG. 2.
Figure 7:
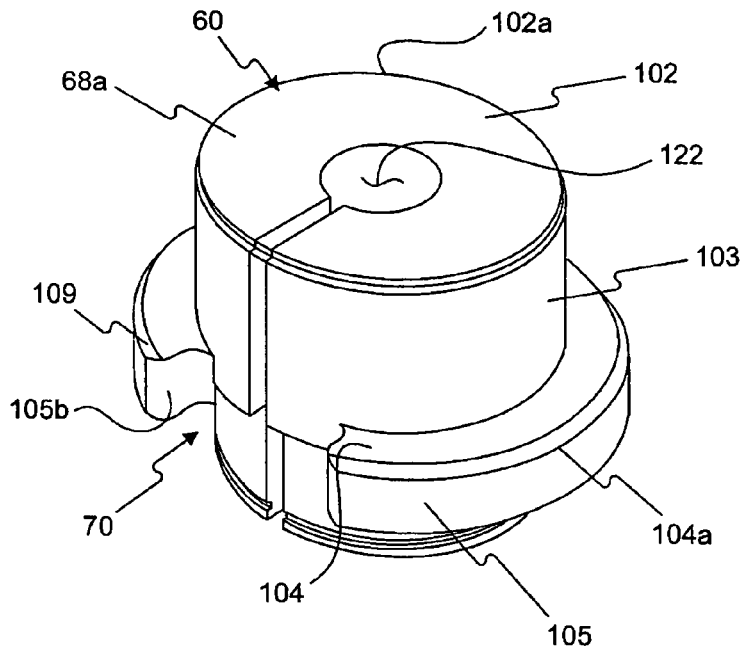
FIG. 7 is a partial top perspective view of an inner pole member of FIG. 2.
Figure 8:
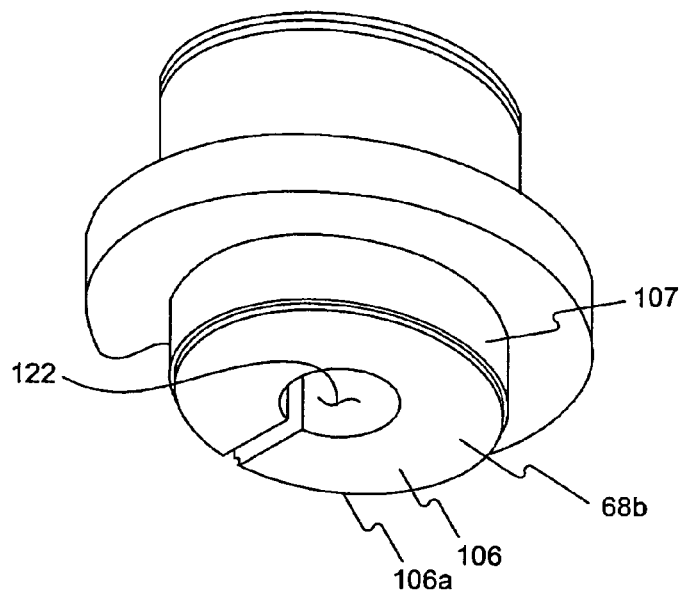
FIG. 8 is a partial bottom perspective view of an inner pole member of FIG. 2.

As illustrated in FIGS. 3 and 4, the inner pole member 68a, 68b may be arranged at least partially within the opening 72 of the outer pole member 66. Referring to FIGS. 7 and 8, the inner pole member 68a, 68b may have at least one generally oval-shaped outer circumference 102a, 104a, 106a at at least one cross-section 102, 104, 106 of the inner pole member 68a, 68b. In the embodiment of FIGS. 3-8, the inner pole block 70 defines a first cross-sectional portion 103, a second cross-sectional portion 105, and a third cross-sectional portion 107 arranged within the opening 72 of the outer pole member 66 along the length of the inner pole block 70. The second cross-sectional portion 105, which may be arranged between the first and third cross-sectional portions 103, 107, notably may have a larger cross-sectional circumference 104a than the first and third cross-sectional portions 103, 107 and may be fixedly engaged with the outer pole member 66. For example, as best seen in FIG. 7, the second cross-sectional portion 105 may have a chamfer 109 formed at an outer circumference thereof. The inner pole block 70 may be welded (e.g., laser welded) to the outer pole member 66 at the second cross-sectional portion 105 of the inner pole block 70, for example along or proximate the chamfer 109. Thus, the inner pole block 70 may be held securely within the outer pole member 66. The second cross-sectional portion 105 may have a cross-sectional circumference 104a that generally mates with the inner wall of the opening 72 in the outer pole member 66. For example, the second cross-sectional portion 105 may be configured to be press-fit into the opening 72 of the outer pole member 66. Moreover, while the second cross-sectional portion 105 may have a generally oval-shaped cross-sectional circumference 104a, the cross-sectional circumference 104a may include a connector chamber portion 105b for receipt of the electrical connector 80 therein. As discussed above with respect to the opening 72 in the outer pole member, the connector chamber portion 105b of the second cross-sectional portion 105 may deviate from or otherwise not conform to the generally oval shape of the cross-sectional circumference thereof.

In one arrangement, the inner and outer pole members 68, 66 may be joined together during a sintering process. For example, material for the inner pole member 68 and material for the outer pole member 66 may be combined in a sintering process to create a coherent mass forming a unitary pole member. Thus, costs to otherwise assemble the inner and outer pole members 68, 66 together may be saved. It should be appreciated that the materials used for the inner and outer pole members 68, 66 in such a sintering process may be different. For example, the inner pole material may be chosen to stress desired magnetic properties of the inner pole member 68, while the outer pole material may be chosen with different material strength characteristics than the inner pole material.

The first coil 64 (referring to FIG. 3) may be disposed around the inner pole member 68a at the first cross-sectional portion 103 thereof (referring to FIG. 7). The second coil 65 (referring to FIG. 4) may be disposed around the pole member 68b at the third cross-sectional portion 107 thereof (referring to FIG. 8). As illustrated in FIGS. 3 and 4, each coil 64, 65 may be arranged between the inner pole member 68a, 68b and the outer pole member 66. Moreover, each coil 64, 65 may be arranged in a generally oval-shaped configuration around the inner pole member 68a, 68b within the opening 72 of the outer pole member 66.

Figure 6A:
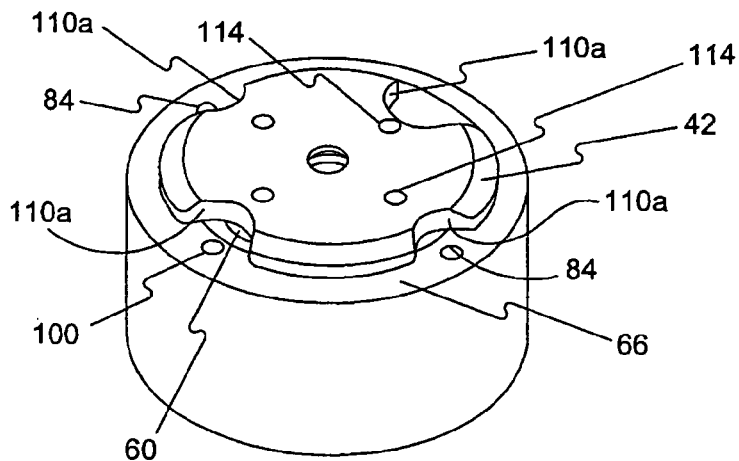
FIGS. 6a and 6b are partial top and bottom perspective views of the stator and coil assembly of FIG. 2 with armatures attached thereto.
Figure 6B:
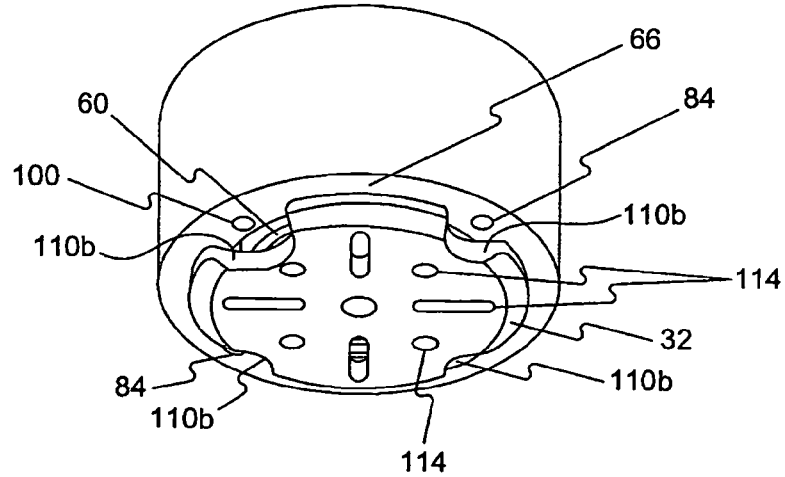

Referring to FIGS. 6a and 6d, each armature 42, 32 may be arranged so that it is movable under the influence of a magnetic field generated by the respective stator 60 and coil 64, 65 (referring to FIGS. 3 and 4) combination and, as described above, may be operable to affect the transmission of fluid through the fluid passageway 100. With reference to armature 42, each armature 42, 32 may be movable between first and second positions, the second position being further from the outer pole member 66 than the first position. For example, when the coil 64 is fully energized, the armature 42 may overcome a force from the spring 45 (referring to FIG. 2) to move toward the outer pole member 66 to a first position. When the coil 64 is de-energized, the armature 42 may be biased away from the outer pole member 66 to a second position.

Each of the armatures 42, 32 may include one or more circumferential openings 110a, 110b therein configured to allow the armature 42, 32 to have a large face area while avoiding interference with the fluid passageway 100 and/or the dowel bores 84. Accordingly, each opening 110a, 110b of an armature 42, 32 may be arranged adjacent to and at least partially surrounding the fluid passageway 100 (or a dowel bore 84) of the outer pole member 66. Thus, when the armature 42, 32 is in its first position adjacent or abutting the outer pole member 66, a flow of fluid from or into the fluid passageway 100 will not be blocked by the armature 42, 32. Each armature 42, 32 may further include through-holes 114 formed therein to permit the transmission of fluid therethrough during movement of the armature 42, 32 for optimized valve motion, valve damping, and force response.

Figure 9:
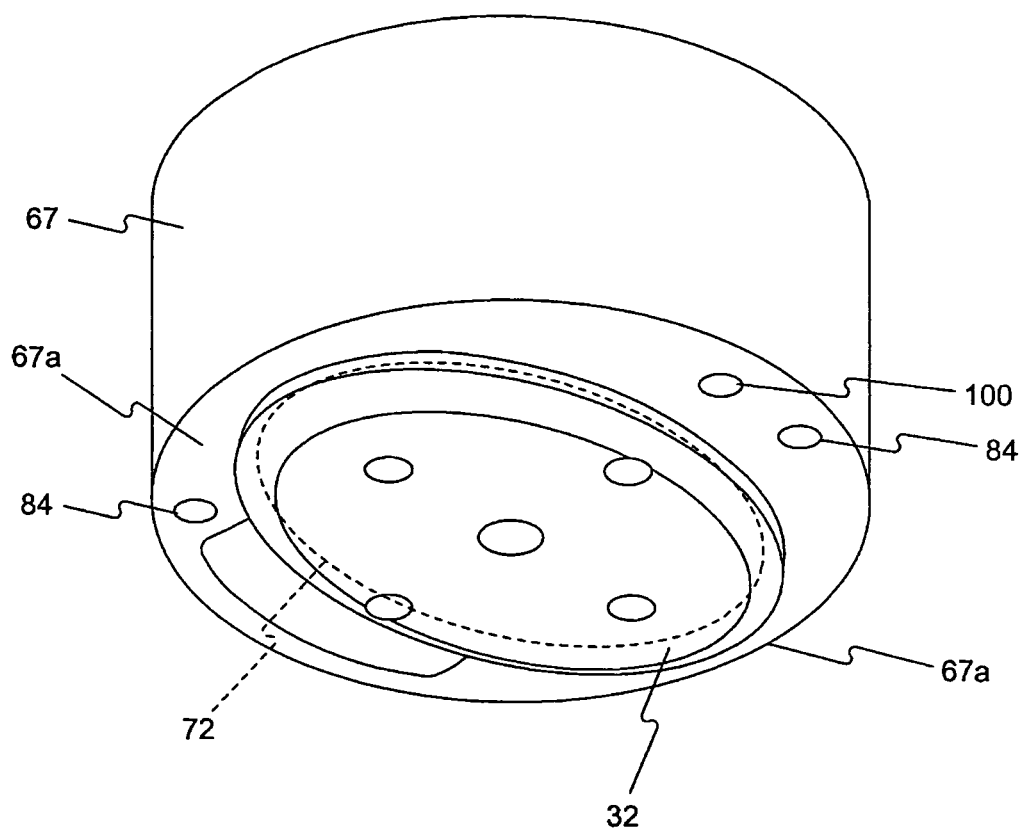
FIG. 9 is a partial bottom perspective view of a stator and coil assembly with an armature attached thereto according to an alternative embodiment of the present invention.

In an alternative embodiment (FIG. 9), one or both of the armatures 42, 32 may have a generally oval-shaped outer circumference. The generally oval-shaped outer circumference may generally align with a generally oval shaped opening 72 in the outer pole 66. Moreover, the opening 72 in the outer pole member 66 may be enlarged to extend further toward the outer circumference of the outer pole block 67 so that the wall of the block 67 at reference point 67a shown in FIG. 9 is thinner than a corresponding portion 67a of the block 67 shown in FIG. 5. Thus, a more pronounced oval shape may be created by the opening 72 of the embodiment of FIG. 9. Due to the thinner wall portion 67a of the outer pole member 66 shown in FIG. 9, the dowel bores 84 may be relocated and disposed within a portion of the outer pole member 66 having a thicker wall. For example, the dowel bores of FIG. 9 have been relocated and are offset from each other by approximately 160 degrees.

It should be appreciated that an embodiment may include armatures 42, 32 having different configurations. For example, the first armature 42 may be generally configured as shown and described above with reference to FIG. 6A, while the second armature 32 may be configured as shown and described with reference to FIG. 9. Thus, while the fluid passageway 100 may be configured as a throughbore completely through the outer pole block 67, one or more of the dowel bores 84 adjacent the armature 32 may be offset from the dowel bores adjacent the first armature 42. Therefore, the bores 84 adjacent the armature 32 may not align with the bores 84 adjacent the first armature 42 and may not extend completely through the outer pole block 67.

Referring now to FIGS. 2, 7, and 8, an embodiment of the present invention may include an actuator housing (e.g., injector body 11) with a generally cylindrical pole housing portion 120 for housing the inner and outer pole members 68, 66 (only shown in FIG. 2). The pole housing portion 120 may include a generally central longitudinal axis 2 therethrough. Notably, the inner pole member 68 may have a bore 122 therein that is generally coaxial with the central longitudinal axis 2. Thus, other actuator members (e.g., the needle control valve member 33, the spring 45, the armatures 32, 42) held within or arranged relative to the bore 122 may be centrally aligned and/or symmetrically configured within the pole housing portion 120 and the injector body 11. For example, the needle control valve assembly 30 and the spill valve assembly 40 may comprise symmetrically formed components and/or may be positioned on-center within the injector body 11. Because the bore 122 and other actuator members may be symmetrically formed and/or centrally aligned within the housing pole portion 120 and the injector body 11, such features and members may be formed and/or assembled via "on-center" precision machining and/or assembly operations, which generally may be less expensive than asymmetrical and/or off-center precision machining and/or assembly operations.

INDUSTRIAL APPLICABILITY

It should be appreciated from the foregoing description that movement of either of the armatures 42, 32 may control the injection of fuel into an engine. More specifically, a magnetic field may be created or modified (e.g., increased, decreased, or eliminated) within a fuel injector 10 by energizing or deenergizing a coil 64, 65 disposed between an inner pole member 68a, 68b and an outer pole member 66. Respective armature(s) 42, 32 may be moved in response to the creation or modification of the magnetic field(s), and high pressure fluid may be transmitted through the fluid passageway 100 in the outer pole member 66 in response to moving the armature(s) 42, 32. Thus, high pressure fuel transmitted through the fluid passageway 100 in the outer pole member 66 may ultimately be expelled from the fuel injector 10 in response to movement of the respective armature(s) 42, 32.

This disclosure provides an apparatus for controlling fluid flow through an actuator while permitting efficient use of materials and space within the actuator. The electrohydraulic actuator described herein is predicted to provide increased actuator force capacity through pole and armature area maximization balanced with production cost and capability and constantly decreasing desired packaging dimensions.

From the foregoing it will be appreciated that, although specific embodiments of the invention have been described herein for purposes of illustration, various modifications may be made without deviating from the spirit or scope of the invention. Other embodiments of the invention will be apparent to those skilled in the art from consideration of the specification and figures and practice of the invention disclosed herein. It is intended that the specification and disclosed examples be considered as exemplary only, with a true scope and spirit of the invention being indicated by the following claims and their equivalents. Accordingly, the invention is not limited except as by the appended claims.

What is claimed is:

1. An electromagnetic actuator for controlling fluid flow comprising:
    an actuator housing having a central longitudinal axis and a pole housing portion;
    a stator disposed within the pole housing portion having an inner pole member, a coil, and an outer pole member having a bore with a fluid-contacting surface for transmitting high pressure fluid therethrough, with the outer pole member being disposed radially between the pole housing portion and the inner pole member along a line extending perpendicularly from the longitudinal axis,
    wherein the coil is disposed around the inner pole member and arranged between the inner pole member and the outer pole member,
    wherein the outer pole member has an opening therein for receipt of the inner pole member and the coil, the opening having a generally oval-shaped cross-section, and
    wherein the inner pole member is arranged within the pole housing portion and has an inner pole bore therethrough, the inner pole bore being coaxial with the central longitudinal axis such that the inner pole bore is centrally aligned within the pole housing portion and the actuator housing, and the inner pole bore is concentric with the outer pole member about the central longitudinal axis; and
    an armature moveable under the influence of a magnetic field generated by the stator and coil and operable to affect transmission of fluid through the bore of the outer pole member and in contact with the fluid-contacting surface.

2. The actuator of claim 1, wherein the inner pole member is arranged at least partially within the opening of the outer pole member and has a generally oval-shaped outer circumference at a cross-section of the inner pole member.

3. The actuator of claim 2, wherein the coil is arranged in a generally oval-shaped configuration around the inner pole member and within the opening of the outer pole member.

4. The actuator of claim 1, wherein at the cross-section of the outer pole member, the outer pole member has a generally circular outer circumference.

5. The actuator of claim 1, wherein a portion of the opening of the outer pole member at the cross-section does not conform to the generally oval shape of the cross-section, the portion being configured to receive an electrical connector therein.

6. The actuator of claim 5, wherein an electrical connector is arranged within the portion of the opening of the outer pole member that does not conform to the generally oval shape of the cross-section, the electrical connector being electrically coupled to the coil.

7. The actuator of claim 1, wherein:
    the armature is movable between first and second positions, the second position being further from the outer pole member than the first position; and
    the armature has a first opening formed therein, the first opening being arranged adjacent to and at least partially surrounding the bore of the outer pole member and being configured to permit the transmission of fluid into and out of the bore when the armature is in the first position.

8. The actuator of claim 1, wherein:
    the outer pole member has at least one dowel bore formed longitudinally therein;
    a portion of a dowel is arranged within the dowel bore; and
    the armature has an opening formed therein, the opening being arranged adjacent to and at least partially surrounding the dowel.

9. The actuator of claim 1, wherein the armature has a plurality of through-holes formed therein to permit the transmission of fluid therethrough during movement of the armature.

10. The actuator of claim 1, wherein:
    the inner pole member includes first, second, and third cross-sectional portions arranged along the length of the inner pole member and being arranged within the opening of the outer pole member; and the second cross-sectional portion has a larger cross-sectional circumference of a cross-section taken perpendicular to a longitudinal axis of the pole housing portion than the first and third cross-sectional portions, is arranged between the first and third cross-sectional portions, and is fixedly engaged with the outer pole member with the second cross-sectional portion disposed within the opening of the outer pole member.

11. The actuator of claim 10, wherein the inner pole member is welded to the outer pole member at the second cross-sectional portion of the inner pole member.

12. The actuator of claim 10, wherein:
a chamfer is formed at an outer circumference of the second cross-sectional portion of the inner pole member; and
the inner pole member is welded to the outer pole member at the chamfer.

13. The actuator of claim 10, wherein:
the coil is arranged around the inner pole member at the first cross-sectional portion of the inner pole member; and
a second coil is arranged around the inner pole member at the third cross-sectional portion of the inner pole member.

14. The actuator of claim 1, wherein:
the outer pole member has at least one dowel bore formed longitudinally therein; and
a portion of a dowel member is arranged within the dowel bore of the outer pole member.

15. The actuator of claim 1, wherein the outer pole member is formed from SAE4118 steel.

16. The actuator of claim 1, wherein the inner and outer pole members are sintered together.

17. The actuator of claim 16, wherein the inner pole member is formed from a first material and the outer pole member is formed from a second material.

18. The actuator of claim 1, wherein movement of the armature controls the injection of fuel into an engine.

19. The actuator of claim 1, wherein the bore is configured for transmitting high pressure fluid at a pressure of at least about 200 MPa.

20. A method for controlling fluid flow through an actuator, comprising:
energizing or deenergizing a coil disposed between an inner pole member and an outer pole member to create or modify a magnetic field, wherein the inner and outer pole members are disposed within a pole housing portion of an actuator housing with the outer pole member being disposed radially between the pole housing portion and the inner pole member along a line extending perpendicularly from a central longitudinal axis of the actuator housing, wherein the outer pole member has a bore having a fluid-contacting surface for transmission of high pressure fluid therethrough, and wherein the inner pole member has an inner pole bore therethrough, the inner pole bore being coaxial with the central longitudinal axis such that the inner pole bore is centrally aligned within the pole housing portion and the actuator housing, and the inner pole bore is concentric with the outer pole member about the central longitudinal axis;
moving an armature in response to the creation or modification of the magnetic field, wherein the outer pole member has an opening therein for receipt of the inner pole member and the coil, the opening having a generally oval-shaped cross-section; and
causing fluid to be transmitted through the bore of the outer pole member in contact with the fluid-contacting surface in response to moving the armature.

21. The method of claim 20, wherein the step of energizing or deenergizing a coil includes energizing or deenergizing a coil disposed around a generally oval-shaped inner pole member.

22. The method of claim 20, wherein the step of energizing or deenergizing a coil includes energizing or deenergizing a coil disposed within an outer pole member having a generally circular outer circumference.

23. The method of claim 20, including causing fluid to flow within through-holes formed within the armature during movement of the armature.

24. The method of claim 20, including:
energizing or deenergizing a second coil disposed between a second inner pole member and the outer pole member to create or modify a magnetic field;
moving a second armature in response to the creation or modification of the second magnetic field; and
affecting the transmission of fluid through the bore of the outer pole member in response to moving the second armature.

25. The method of claim 20, wherein:
the fluid is fuel; and
the method includes causing fuel that has been transmitted through the bore of the outer pole member to be expelled from a fuel injection device in response to moving the armature.

26. The method of claim 20, wherein the step of causing fluid to be transmitted through a bore of the outer pole member includes causing fluid to be transmitted through the bore at a pressure of at least about 200 MPa.

27. The actuator of claim 10, wherein the second cross-sectional portion of the inner pole member has an outer circumferential surface and the opening of the outer pole member has an inner circumferential surface, and wherein the outer circumferential surface is engaged by the inner circumferential surface when the second cross-section of portion is disposed within the opening of the outer pole member.

* * * * *